United States Patent [19]

Okafuji et al.

[11] Patent Number: 4,696,713
[45] Date of Patent: Sep. 29, 1987

[54] METHOD AND APPARATUS FOR PRESSING LAMINATED GLASS

[75] Inventors: Masaharu Okafuji, Maizuru; Yoshinori Ochi, Nishinomiya; Atsushi Miyake, Maizuru; Junichi Noguchi, Maizuru; Ichiro Matsuo, Maizuru, all of Japan

[73] Assignee: Nippon Sheet Glass Co., Ltd., Osaka, Japan

[21] Appl. No.: 825,964

[22] Filed: Feb. 5, 1986

Related U.S. Application Data

[63] Continuation of Ser. No. 627,858, Jul. 5, 1984, abandoned.

[30] Foreign Application Priority Data

Jul. 5, 1983 [JP] Japan ................... 58-122198

[51] Int. Cl.⁴ .............................. B32B 31/00
[52] U.S. Cl. ...................... 156/358; 100/47; 100/48; 100/99; 100/155 G; 156/64; 156/99; 156/102; 156/103; 156/351; 156/378; 156/391; 364/473; 364/476
[58] Field of Search ............ 156/391, 64, 99, 351, 156/102, 358, 103, 378; 364/473, 476; 100/47, 99, 48, 155 G

[56] References Cited

U.S. PATENT DOCUMENTS

| | | | |
|---|---|---|---|
| 2,380,550 | 7/1945 | Reed | 15/4 |
| 2,781,534 | 2/1957 | Cochran et al. | 15/77 |
| 2,831,791 | 4/1958 | Downes et al. | 156/103 |
| 2,926,371 | 3/1960 | Swindler | 15/77 |
| 2,951,254 | 9/1960 | Cole et al. | 15/21 |
| 3,054,344 | 9/1962 | Boicey et al. | 100/169 |
| 3,146,696 | 9/1964 | Madge | 100/155 G |
| 3,351,001 | 4/1965 | Achkio | 100/176 |
| 3,694,636 | 9/1972 | Smith | 364/476 |

FOREIGN PATENT DOCUMENTS

| | | | |
|---|---|---|---|
| 576344 | 5/1959 | Canada | 156/102 |
| 784558 | 10/1957 | United Kingdom | 156/358 |

*Primary Examiner*—John J. Gallagher
*Attorney, Agent, or Firm*—Fitzpatrick, Cella, Harper & Scinto

[57] ABSTRACT

A method and apparatus for pressing curved laminated glass having an adhesion interlayer between curved sheets of plate glass by passing the curved laminated glass through a pair of press rolls. A level of a contact position between said pair of press rolls and an inclination angle of a line connecting axes of said pair of press rolls with respect to a curved surface of the laminated glass are controlled to control a posture of said pair of press rolls upon movement of the laminated glass so as to correspond to controlled rotation of said pair of press rolls. A line of action of a press pressure is directed along a direction substantially normal to the curved surface of the laminated glass, and the location of application of the press pressure is level-shifted along the curved surface of the laminated glass. The posture of the press rolls is controlled in accordance with prestored data sampled along the curved surface of the laminated glass.

19 Claims, 23 Drawing Figures

METHOD AND APPARATUS FOR PRESSING LAMINATED GLASS

This application is a continuation of application Ser. No. 627,858 filed July 5, 1984, now abandoned.

CROSS REFERENCE TO RELATED APPLICATIONS

This application discloses subject matter disclosed in copending application Ser. No. 627,769, filed July 5, 1984 in the names of the same inventors and entitled METHOD AND APPARATUS FOR CLEANING A CURVED GLASS SHEET, now U.S. Pat. No. 4,558,480.

BACKGROUND OF THE INVENTION

1. Field of the Invention

The present invention relates to a method and apparatus used in an adhesion process for adhering laminated glass (safety glass) such as a windshield of a vehicle.

2. Description of the Prior Art

In a conventional windshield of a vehicle, a plurality of sheets of plate glass are adhered together through a plastic film such as a polyvinyl butyral film to prepare so-called safety glass. Such laminated glass is prepared such that adhesion interlayers are inserted between the plastic film and the sheets of plate glass and are preliminarily adhered thereto. The resultant structure is finally pressed in an autoclave. The preliminary adhesion is performed to remove bubbles, water content and residual steam from the adhesion layers. In principle, an apparatus is used wherein the laminated glass is passed through a pair of press rolls.

According to the most basic press roll apparatus, a pair of press rolls are vertically disposed, and a worker at the insertion side inserts laminated glass into the pair of press rolls and another worker at the exhaustion side picks it up from the pair of press rolls. This apparatus has disadvantages in that the operation requires much labor and a uniform pressure cannot be obtained when the laminated glass has a complicated three-dimensional surface.

A conventional automatic press roll apparatus has been used to automatically perform the preliminary adhesion process for a three-dimensional glass surface. According to this press roll apparatus, each of the pair of press rolls is divided into a plurality of annular segments. Some of the roll segments can then be inclined in accordance with the curved surface of the laminated glass. In addition, all the roll segments are supported by a rotational frame. When the glass passes between the press rolls, the rotational frame swings in accordance with the curved surface of the glass so as to apply a constant press pressure to the glass surface in the direction perpendicular to the glass surface. This conventional automatic press roll apparatus also has a counterbalance mechanism for cancelling the weights of the press rolls so as to obtain a constant press pressure when the rotational frame swings and the pressure application direction is inclined with respect to the vertical direction (the direction of gravity).

This press roll apparatus is effective for automatically pressing the laminated glass having a relatively simple three-dimensional surface. However, the rotational frame and the counterbalance mechanism are driven by a guide cam corresponding to each three-dimensional surface. The guide cam must be replaced with another guide cam corresponding to the surface of the windshield in accordance with the type of vehicle. Therefore, this conventional press roll apparatus is not suitable for mass production of different types of windshield.

SUMMARY OF THE INVENTION

It is, therefore, a principal object of the present invention to provide a method and apparatus wherein laminated glass having a three-dimensional surface is pressed uniformly without using a guide cam.

It is another object of this invention to improve press performance for the complicated three-dimensional surface of the laminated glass by providing good flexibility and reproducibility to follow the curved surface.

It is a further object of this invention to improve the press efficiency for laminated glass sheets having different three-dimensional surfaces by providing flexibility based on control data corresponding to respective glass sheets.

In order to achieve the above objects of the present invention, there are provided press rolls which receive laminated glass having an adhesion film between sheets of plate glass. The press rolls are rotatably supported on a roll frame, and the roll frame can be pivoted such that the direction of pressure application is substantially normal to the curved surface of the laminated glass. The roll frame is supported by a support frame such that the pressure application point can be vertically displaced along a direction perpendicular to the major three-dimensional surface. The rotation of the press rolls, the angular displacement of the roll frame, and the level change of the roll frame are performed by respective driving sources which are controlled by a control device in accordance with prestored data. When the data representing the curved surface of the laminated glass is stored in the control device, the press roll apparatus can automatically press laminated glass having any three-dimensional surface in accordance with the prestored data without the need for partially modifying the apparatus.

Other and further objects of this invention will become obvious upon an understanding of the illustrative embodiments about to be described or will be indicated in the appended claims, and various advantages not referred to herein will occur to one skilled in the art upon employment of the invention in practice.

DETAILED DESCRIPTION OF THE PREFERRED EMBODIMENT

The present invention will be described in detail with reference to a preferred embodiment.

Figure 1:
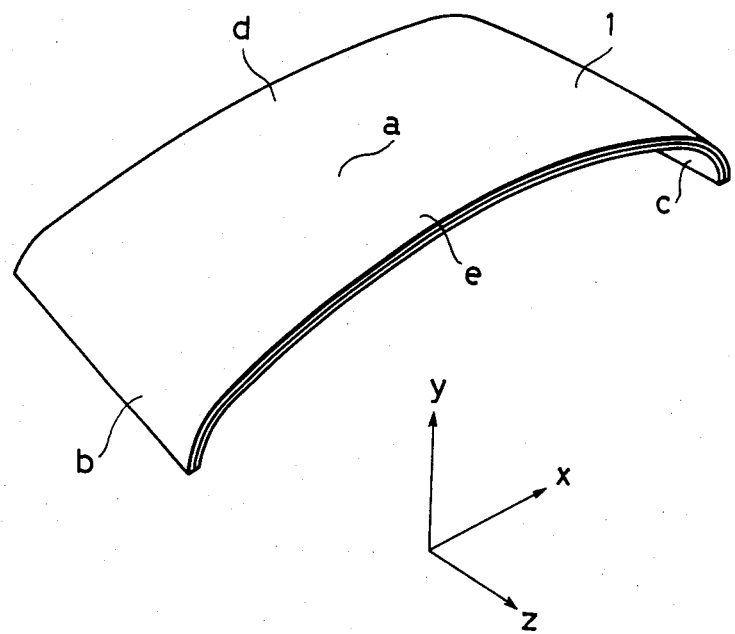
FIG. 1 is a perspective view of a windshield of a vehicle which has been subjected to preliminary adhesion.

FIG. 1 is a perspective view of a windshield of a vehicle which has been subjected to preliminary adhesion. A windshield comprising a glass plate 1 typically has a complicated three-dimensional surface curved along x-, y- and z-axes. A central portion a of the glass plate 1 is substantially flat, and two wing portions b and c are greatly bent. An intermediate portion from the wing portion b to the wing portion c is moderately bent in a convex shape. The radius of curvature in an upper side portion d is different from that in a lower side portion e. An intermediate portion from the upper side portion d to the lower side portion e is also moderately bent.

Figure 2:
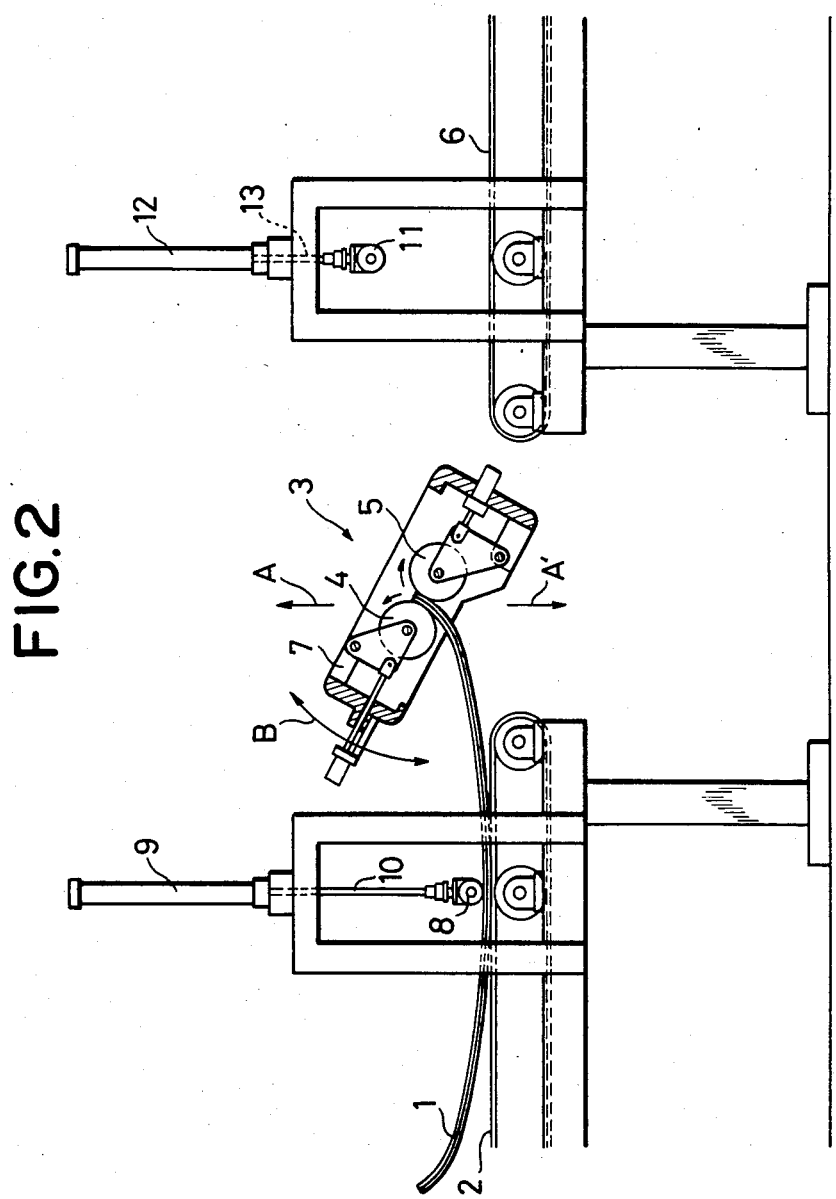
FIG. 2 is a side view schematically showing a press roll apparatus according to an embodiment of the present invention.

FIG. 2 is a side view schematically showing the preliminary adhesion press roll apparatus according to an embodiment of the present invention. Referring to FIG. 2, the two-layer glass plate 1 having an adhesion interlayer between two sheets of plate glass is fed by a supply conveyor 2 along the x-axis in FIG. 1 and is pressed between upper and lower rolls 4 and 5 of a press roll unit 3. The glass plate 1 passing through the press roll unit 3 is taken up by a take-up conveyor 6. The upper and lower rolls 4 and 5 are rotatably supported by a roll frame 7. The roll frame 7 is mounted on a support frame to be vertically movable (along directions indicated by arrows A and A' in FIG. 2) and to be pivotal about a contact line between the upper and lower rolls 4 and 5 along the directions indicated by arrows B.

The pivotal and vertical movements of the roll frame 7 are controlled by an NC (numerical control) machine in accordance with numerical data prestored in correspondence to the shape of the glass plate 1. The pivot angle of the roll frame can be automatically controlled such that a line connecting the axes of the upper and lower rolls 4 and 5 (i.e., the line of action of the press pressure) is normal to the glass plate 1. In addition, the height (i.e., the height of the point of action of the press pressure) of the roll frame 7 is automatically controlled such that the glass plate 1 will not be vertically moved while passing through the press roll unit but instead will be fed along only in the horizontal direction.

Furthermore, the rotational speed of the upper and lower rolls 4 and 5 is controlled by the NC machine in accordance with the prestored numerical data. When the rolls are rotated in opposing directions, the glass plate 1 is transported at a predetermined speed during pressing. The roll frame 7 is controlled to be movable relative to the glass plate 1 along the x-axis (horizontal) and the y-axis (vertical) of FIG. 1. The line of action of the press pressure acts on the glass surface in a direction perpendicular thereto. This can be readily understood if it is assumed that an NC machine deals with the glass plate 1 as a workpiece placed on an X-Y table and has the upper and lower rolls 4 and 5 as tools. However, it should be noted that a displacement (alignment) along the x-axis corresponds to the angular interval of the upper and lower rolls 4 or 5 and that the upper and lower rolls 4 and 5 as tools are moved along the y-axis. The above assumption can be applied if these two differences are excluded.

The preliminary adhesion press roll apparatus of this embodiment has a pair of glass hold rolls 8 for firmly holding the glass plate 1 so as to feed it to the press roll unit 3. The pair of glass hold rolls 8 are disposed along the width of the supply conveyor 2 in the vicinity of the terminal portion of the conveyor 2 and are vertically movably and rotatably mounted at bifurcated distal ends of rod 10 of air cylinder 9, respectively. The glass hold rolls 8 are moved downward immediately before the glass plate 1 is clamped between the upper and lower rolls 4 and 5. The glass plate 1 is urged by the glass hold rolls 8 against the supply conveyor 2. As a result, the glass plate 1 can be properly inserted between the upper and lower rolls 4 and 5 along the x-axis without being distorted (rotated) within the horizontal plane. The glass hold rolls 8 are moved upward immediately after the glass plate 1 is firmly fed into the press roll unit 3.

Glass hold rolls 11 having the same construction as the rolls 8 are mounted above the take-up conveyor 6. The rolls 11 are vertically movably and rotatably mounted at distal ends of rods 13 of air cylinders 12, respectively. The glass plate 1 passing through the press roll unit 3 is temporarily held on the conveyor 6 by the rolls 11. Therefore, the glass plate 1 can be taken up by the take-up conveyor 6 without being distorted on the horizontal plane.

Figure 3:
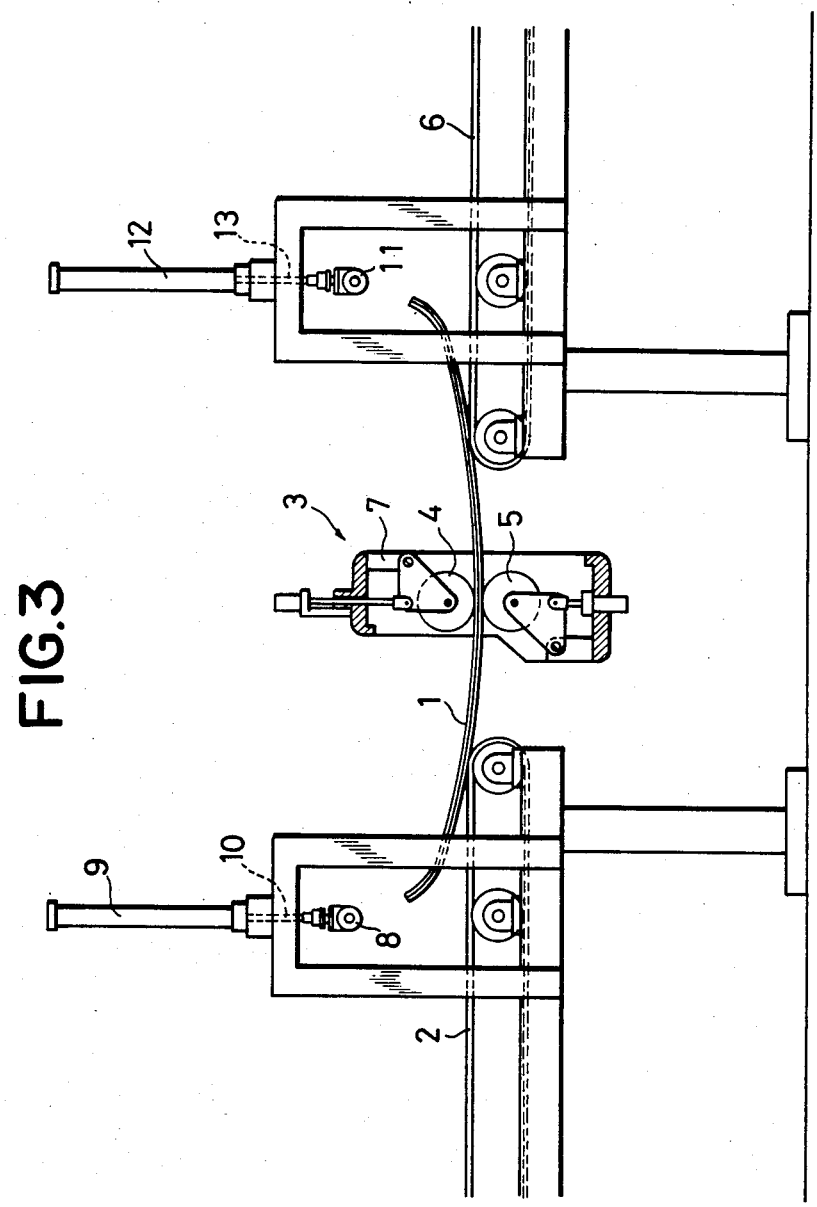
FIG. 3 is a side view of the apparatus of FIG. 2 so as to explain the preliminary adhesion, when viewed from the same side as in FIG. 2.

FIG. 3 is a side view of the press roll apparatus when viewed from the same side as illustrated in FIG. 2, but showing a different state of preliminary adhesion. Upon horizontal displacement of the glass plate 1, the roll frame 7 is gradually pivoted such that the press pressure acts on the surface of the glass plate 1 in a direction perpendicular to the surface thereof. The press roll unit 3 stands substantially upright when it is located at the center of the glass plate 1 along the feeding direction, as shown in FIG. 3. The height of the roll frame 7 also changes in accordance with the height of the surface of the glass plate 1. It is apparent from the shape of the glass plate 1 that the inclination and height of the roll frame 7 are inverted after the state shown in FIG. 3. Further illustration need not be provided since the symmetrical view about the vertical line corresponding to the arrows A and A' (FIG. 2) shows the end of preliminary adhesion.

Figure 4:
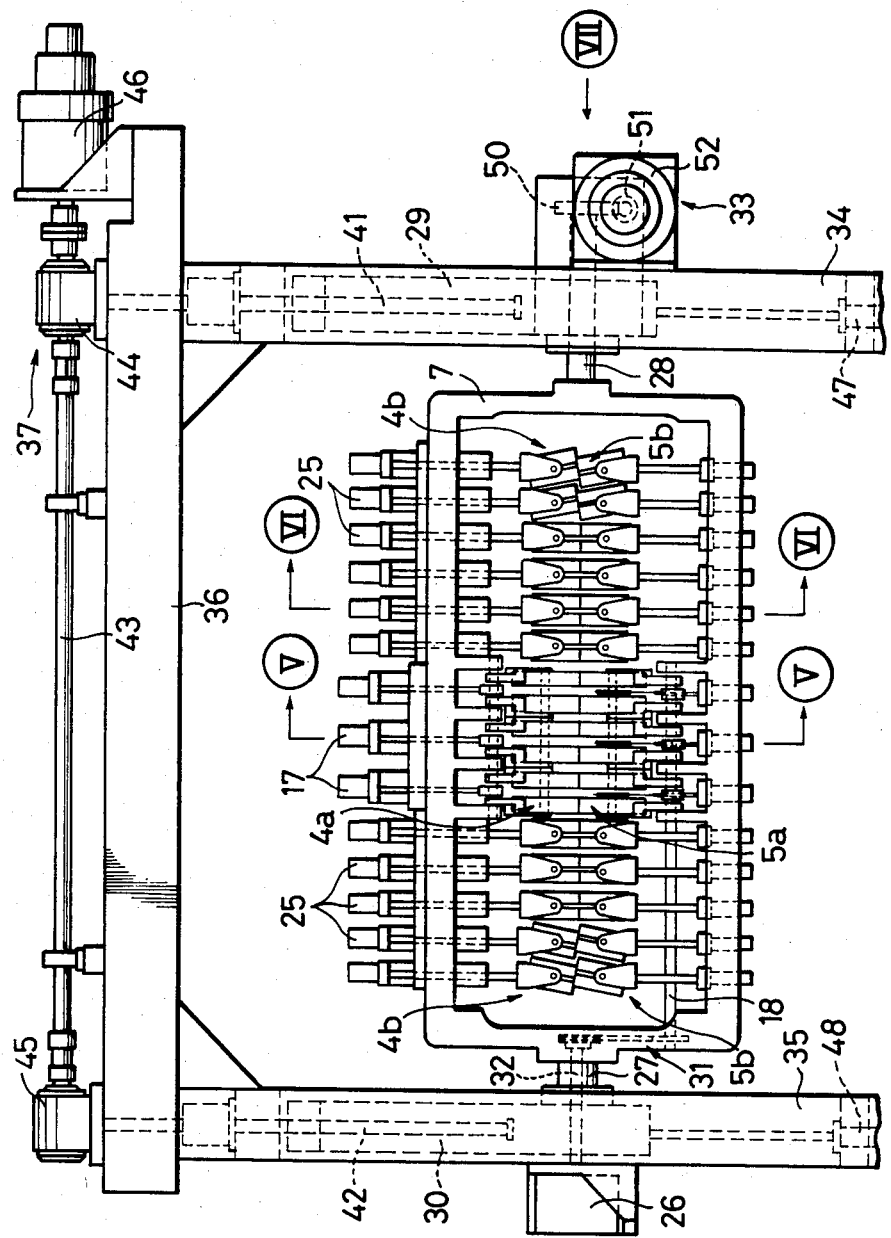
FIG. 4 is a front view of a press roll unit 3 of the apparatus of FIG. 1.
Figure 5:
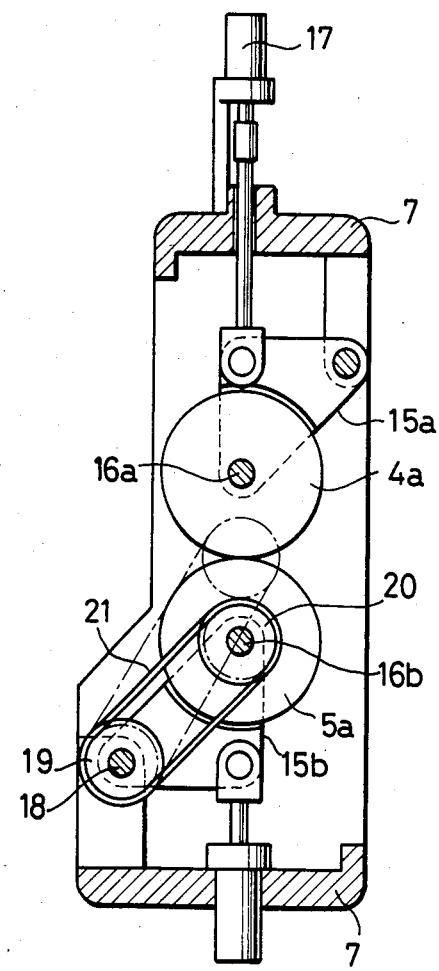
FIG. 5 is a sectional view of the press roll unit along a line V—V of FIG. 4.
Figure 6:
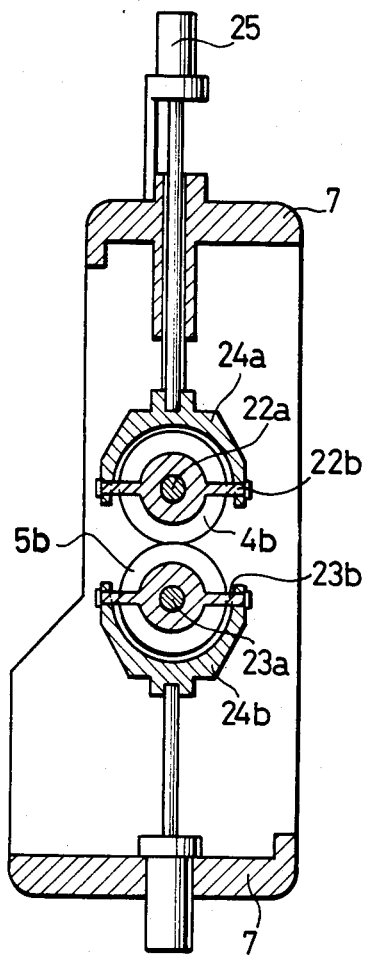
FIG. 6 is a sectional view of the press roll unit along a line VI—VI of FIG. 4.
Figure 7:
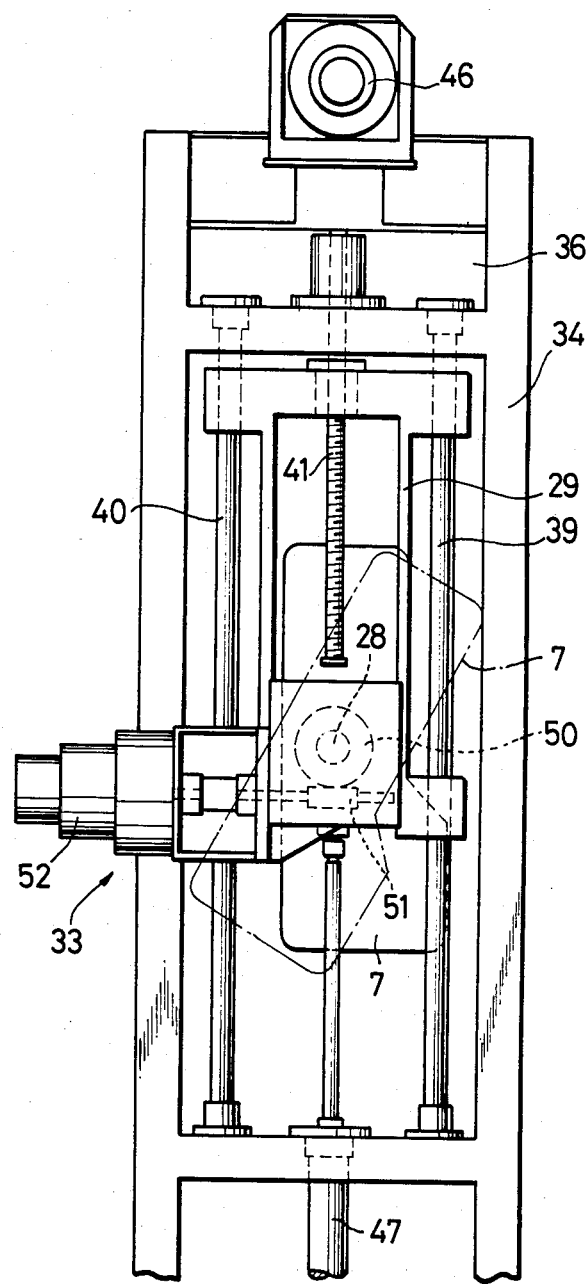
FIG. 7 is a side view of the press roll unit along an arrow VII of FIG. 4.

FIG. 4 is a front view of the press roll unit 3, FIG. 5 is a sectional view thereof along the line V—V of FIG. 4, FIG. 6 is a sectional view thereof along the line VI—VI, and FIG. 7 is a side view thereof along the arrow VII of FIG. 4.

As shown in FIG. 4, each of the upper and lower rolls 4 and 5 is divided into a plurality of segments. Three central segments comprise drive rolls 4a or 5a, and right six segments and left five segments comprise free rolls 4b or 5b which can be inclined along the curved surface of the glass plate 1 and which cannot be externally driven.

As shown in FIG. 5, each pair of drive rolls 4a and 5a are rotatably supported by shafts 16a and 16b at distal ends of a pair of support arms 15a and 15b, respectively. The pair of drive rolls 4a and 5a are mounted on the roll frame 7 so as to clamp the glass plate 1 through the support arms 15a and 15b, respectively. The upper roll 4a is biased by a bellofram cylinder 17. The lower roll 5a is driven by a timing belt 21 looped between a gear 19 mounted on a drive shaft 18 and a gear 20 mounted on the roll 5a.

As shown in FIG. 6, each pair of free rolls 4b and 5b is supported by support arms 24a and 24b having orthogonal axes 22a and 22b, and 23a and 23b to be rotated along the feed direction of the glass plate 1 and to be inclined along the curved surfaces of the glass plate 1, as shown in FIG. 6, respectively. The upper roll 4b is biased downward by a corresponding bellofram cylinder 25.

As shown in FIG. 4, the roll frame 7 for supporting the drive rolls 4a and 5a and the free rolls 4b and 5b is pivotally supported by lift frames 29 and 30 respectively through a shaft 28 and a hollow shaft 27 whose axes correspond to a contact line between the upper roll 4 and the lower roll 5. The drive shaft 18 for rotating the drive rolls 5a extends at the side surface of the roll frame 7 and is coupled to a shaft 32 extending through a space of the hollow shaft 27 through a transmission mechanism 31 made of a chain and sprockets. The shaft 32 is driven by a motor 26 fixed at the distal end of the lift frame 30. The shaft 28 of the roll frame 7 extends through a bearing of the lift frame 29 and is coupled to a swinging mechanism 33, thereby swinging the roll frame 7 about the shafts 27 and 28.

The lift frames 29 and 30 are slidably mounted in columns 34 and 35 and can be vertically moved by a lift mechanism 37 mounted on a beam 36 extending across the distal ends of the columns 34 and 35.

FIG. 7 is a side view of the press roll unit and its peripheral components. The lift frame 29 is slidably supported in the column 34 through two guide rods 39 and 40 and can be vertically moved upon rotation of a screw rod of the lift mechanism 37. Screw rods 41 and 42 of the lift frames 29 and 30 are driven by a motor 46 through reduction gear mechanisms 44 and 45 (FIG. 4) coupled through a shaft 43. Air cylinders 47 and 48 are mounted as dampers at the lower ends of the lift frames 29 and 30, respectively. The swinging mechanism 33 is mounted at the lower end of the lift frame 29. The swinging mechanism 33 comprises a worm wheel 50 mounted at the distal end of the shaft 28 of the roll frame 7, a worm 51 and a motor 52 for driving the worm 51, as shown in FIG. 7.

Figure 8:
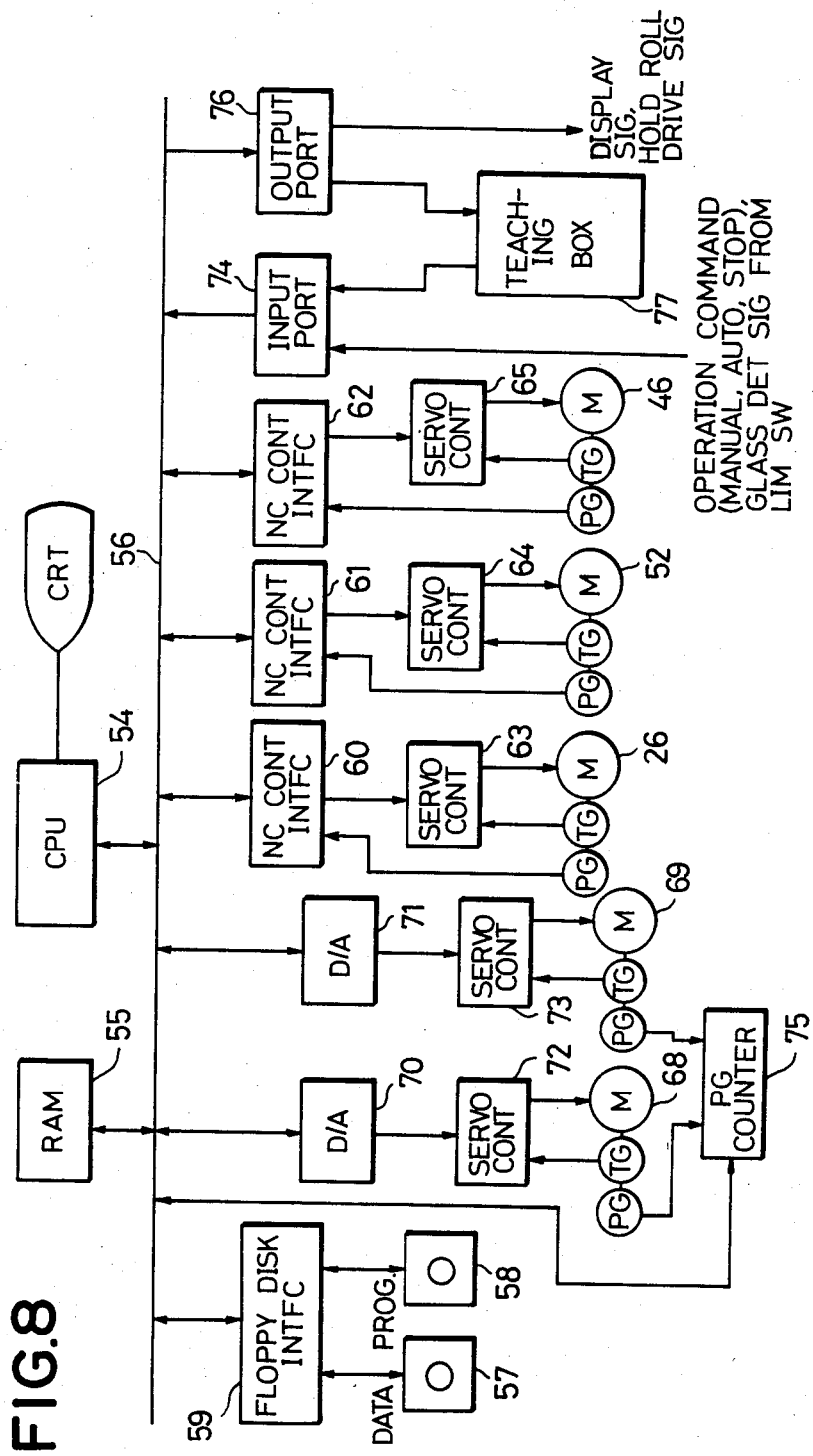
FIG. 8 is a block diagram of a control section of the press roll apparatus shown in FIG. 2.

FIG. 8 is a block diagram of a control section of a preliminary adhesion press roll apparatus. As shown in FIG. 8, the control section comprises a microcomputer which includes a CPU 54, a RAM 55 and data bus 56. The control section is connected to the press roll unit 3 of FIGS. 2 to 7 through a plurality of interfaces. Posture control (inclination angle and height) of the roll frame 7, rotational speed control of the rolls 4 and 5, and conveyor speed control are performed in accordance with the control data stored in a data floppy disk 57 and the control program stored in a program floppy disk 58. The data read out from the floppy disks 57 and 58 are stored in the RAM 55 through an floppy disk interface 59. The CPU 54 controls the overall operation of the roll press apparatus in accordance with the program stored in the RAM 55. The data are sequentially read out from the RAM 55 and are supplied to NC control interfaces 60 to 62. Servo controllers 63 to 65 are operated in response to control outputs from the NC control interfaces 60 to 62 so as to drive the motors 26, 52 and 46, respectively.

A tachogenerator TG and a pulse generator PG are connected to each of the motors 26, 52 and 46. An output from the tachogenerator TG is fed back to the corresponding one of the servo controllers 63 to 65, so that the corresponding one of the motors 26, 52 and 46 is controlled to have a specified rotational speed. The output generated from each of the pulse generators PG corresponding to the corresponding one of the motors 26, 52 and 46 is fed back to the corresponding one of the NC control interfaces 60 to 62. The posture (height and rotational angle) of the roll frame 7 and the angular interval of the rolls are NC-controlled in accordance with the outputs from the pulse generators PG and the control data from the CPU 54. The control data represents 20 sampling points of the glass plate 1 along the x-axis, as will be described later. The NC control interfaces 60 to 62 perform interpolation (primary or secondary interpolation) between every two adjacent sampling points in the same manner as in the conventional NC machine.

In the control section shown in FIG. 8, the synchronous operation of conveyor motors 68 and 69 is controlled so as to synchronize the translational speed of the glass plate 1 with the feeding speed of the supply and take-up conveyors 2 and 6 when the glass plate 1 is inserted between the upper and lower rolls 4 and 5 and passes therethrough. A horizontal translational velocity $V_x$ of the glass plate 1 is calculated by the CPU 54 in accordance with function $V_x = V_R \sin \theta$ where $V_R$ is the roll rotational velocity data and $\theta$ is the angle data of the roll frame 7. Data representing the speeds of the conveyors 2 and 6 in accordance with the calculated results are supplied to D/A converters 70 and 71, respectively. Outputs from the D/A converters 70 and 71 are supplied to servo controllers 72 and 73, respectively, thereby synchronizing the speeds of the conveyor motors 68 and 69.

The control of the glass hold rolls 8 and 11 at the time when the glass plate 1 is inserted between the press rolls 4 and 5 or removed therefrom can be performed such that a limit switch (to be described later) detects the position of the glass plate 1 on the corresponding conveyor and that the output of the pulse generator PG for the conveyor motor 68 or 69 is counted to estimate the insertion or removal position. An output from the limit switch is supplied to the CPU 54 through an input port 74. A pulse generator counter 75 is started under the control of the CPU 54 to count the PG output from the pulse generator of the motor 68 or 69. A count of the PG counter 75 is supplied to the CPU 54 and when it reaches a predetermined value, the drive signal is supplied to the rolls 8 or 11 through an output port 76.

The input port 74 receives operation command inputs (e.g., automatic, manual and stop commands) of the apparatus and outputs display signals to monitor lamps for indicating the operating state. A teaching box 77 is coupled to the input and output ports 74 and 76, so that the command or instruction data for teaching (to be described later) are supplied to the NC control interfaces 60 to 62 through the CPU 54.

Figure 9:
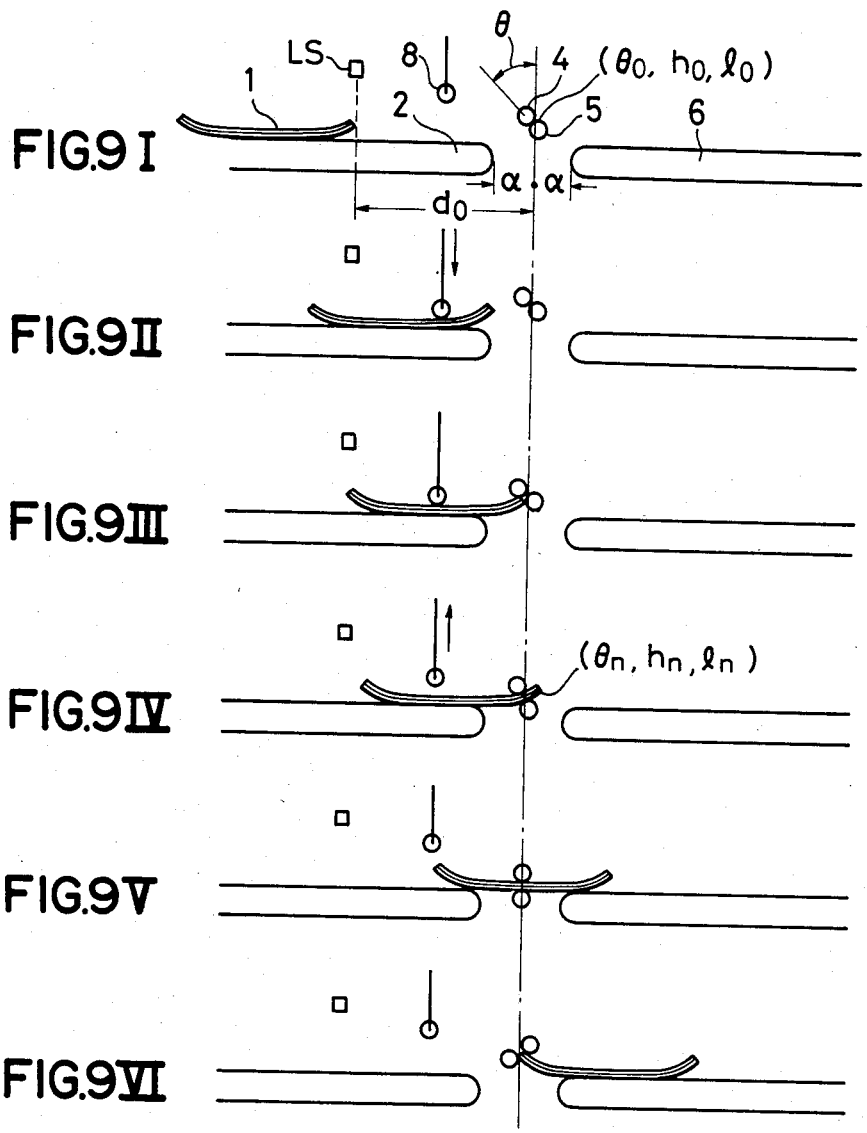
FIGS. 9I to 9VI are respectively sectional views for explaining the operation of the press roll apparatus of FIG. 2.

The operation of the preliminary adhesion press roll apparatus will be described in detail with reference to the flow chart (FIG. 9) of overall operation, the flow chart (FIG. 10) of the operation of the glass hold roll 8 and the press rolls 4 and 5, and the flow chart (FIG. 11) of velocity synchronization of the supply conveyor 2 and the take-up conveyor 6. It should be noted that the operation block numbers of FIGS. 10 and 11 correspond to the surfaces of figure numbers of FIG. 9, respectively.

Predetermined data $\theta_0$ and $h_0$ are supplied from the CPU 54 to the NC control interfaces 61 and 62 so as to determine that the posture (inclination angle $\theta$ and height h) of the rolls 4 and 5 are set so as to allow insertion of the glass plate 1 therebetween, as shown in FIG. 9I. The position of the press rolls on the glass plate 1 along the x-axis (horizontal direction) is represented by an angular rotational interval l of the roll. In the insertion standby state described above, the rolls 4 and 5 are stopped, so that $l = l_0 = 0$.

In this standby mode, when the glass plate 1 on the supply conveyor 2 reaches a limit switch LS, as shown in FIG. 9I, the position measurement of the glass plate 1 which corresponds to the vertical movement timing of the glass hold rolls 8 and the glass plate insertion timing are started in accordance with the detection output from the limit switch LS and the PG output of the supply conveyor 2. When the glass plate 1 reaches a position where the glass hold rolls 8 are moved at their lower positions, the rolls 8 are also moved downward, as shown in FIG. 9II. When the glass plate 1 reaches the insertion position, as shown in FIG. 9III, the NC control is started to calculate the roll rotational velocity, the inclination angle $\theta$ and height h of the rolls 4 and 5. The glass plate 1 is inserted between the upper and lower press rolls 4 and 5, thereby starting the preliminary adhesion operation. In the position where the insertion of the glass plate between the press rolls 4 and 5 is completed, the glass hold rolls 8 are moved upward, as shown in FIG. 9IV. Subsequently, as shown in FIGS. 9IV, 9V and 9VI, the inclination angle of the press rolls, the roll height, the angular rotational interval of the roll, and the roll rotational velocity ($\theta_n$, $h_n$, $l_n$ and $v_n$) are NC-controlled in accordance with the data supplied from the CPU 54.

Figure 10:
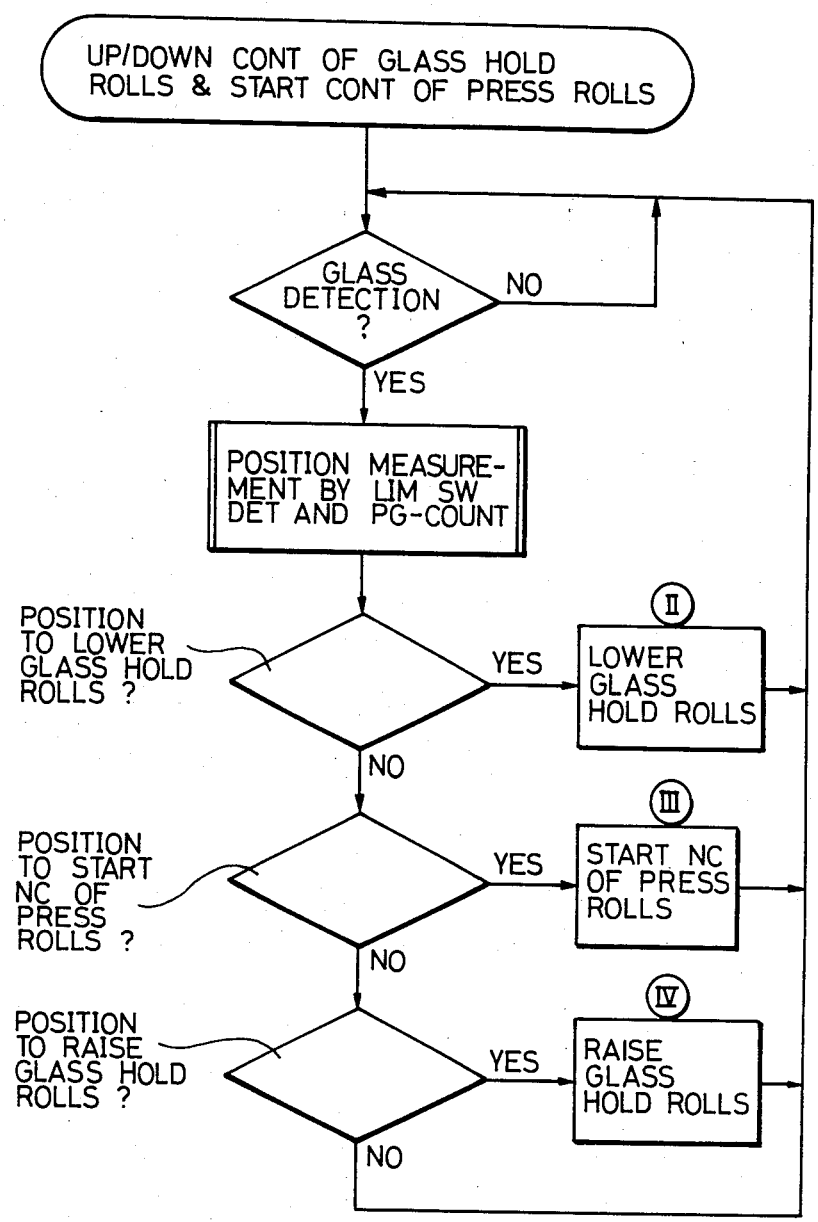
FIG. 10 is a flow chart for explaining the operation of a glass hold roll and press rolls.

The velocities of the supply conveyor 2 and the take-up conveyor 6 are synchronized at the roll rotational velocity while the press rolls 4 and 5 are brought into tight contact with the glass plate 1, as shown in blocks III, IV and V of FIG. 10. This synchronization control is performed in accordance with the flow chart of FIG. 11. The rotational velocity $V_R$ (peripheral velocity) of the press roll is calculated, the horizontal translational velocity $V_R \sin \theta$ ($\theta$ is the inclination angle of the press rolls 4 and 5 with respect to the vertical direction) of the glass plate 1 fed by the press rolls 4 and 5 is calculated, and a velocity command is supplied to the D/A converters 70 and 71 of FIG. 8 so as to match the horizontal translational velocity of the glass plate with the conveyor velocity $V_c$. The conveyor velocity is gradually increased immediately after the glass plate 1 is inserted between the press rolls 4 and 5 (i.e., with a decrease in the inclination angle $\theta$) in accordance with the synchronization control. As shown in FIG. 9V, the velocity becomes a constant high speed at the flat portion ($\theta = 90°$ and $\sin \theta = 1$) of the glass plate 1. In addition, the conveyor velocity $V_c$ at the trailing end of the glass plate 1 is gradually decreased in accordance with an increase in inclination angle $\theta$.

Figure 11:
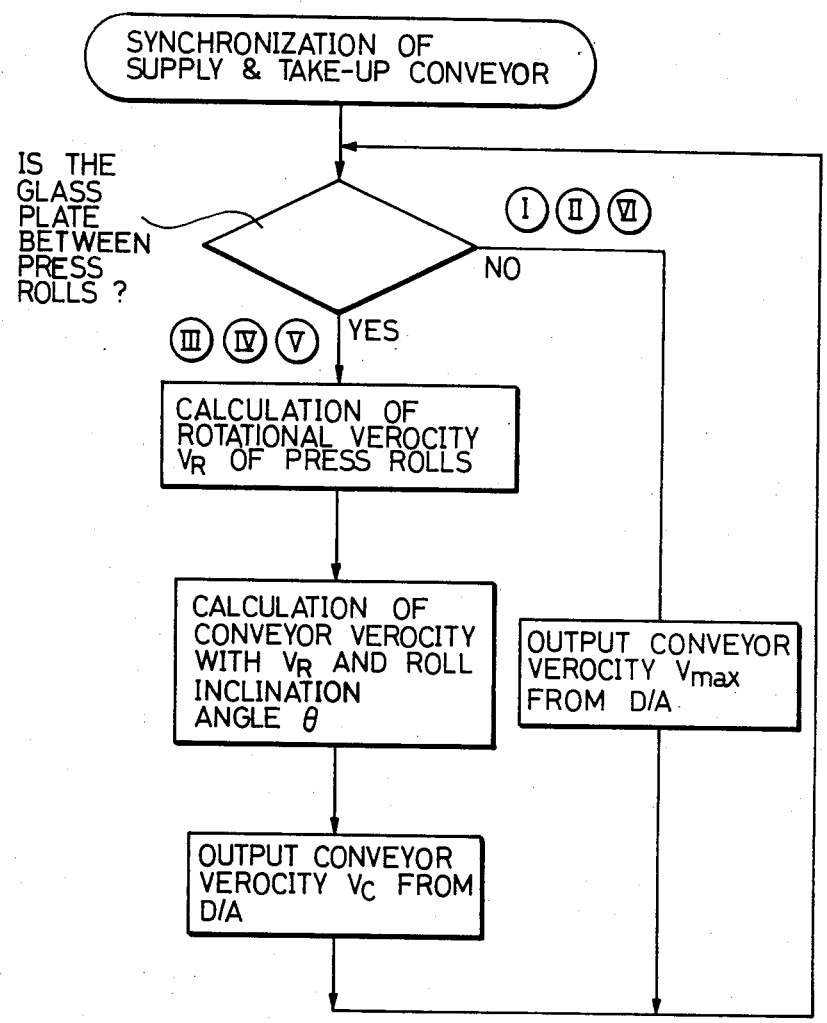
FIG. 11 is a flow chart for explaining the velocity synchronism operation between a supply conveyor and a take-up conveyor.

When the glass plate 1 is not inserted between the press rolls 4 and 5, as shown in FIGS. 9I, 9II and 9VI, the velocity signal is supplied to the D/A converters 70 and 71 in such a manner that the conveyor velocity $V_c$ becomes a maximum velocity $V_{max}$, as shown in the flow chart of FIG. 11. More particularly, referring to FIG. 9I, until the leading end of the glass plate 1 reaches the limit switch LS, the supply conveyor 2 is driven at the maximum velocity $V_{max}$. However, when the leading end of the glass plate 1 reaches the press rolls 4 and 5, as shown in FIG. 9III, the velocity of the supply conveyor 2 is reduced from the maximum velocity $V_{max}$ to the predetermined insertion velocity. Subsequently, when the glass plate 1 is fed by a distance $(d_0 - \alpha)$ of FIG. 9I after the trailing end of the glass plate 1 passes the limit switch LS (i.e., when the glass plate 1 is not present on the supply conveyor), the velocity of the supply conveyor 2 is increased to the maximum velocity $V_{max}$. At the same time, when the glass plate 1 is fed by a distance $(d_0 + \alpha)$ after the trailing end of the glass plate 1 has passed the limit switch LS (i.e., when the glass plate is removed from the press rolls 4 and 5), the velocity of the take-up conveyor 6 is increased to the maximum velocity $V_{max}$. The position of the glass plate 1 can be calculated by the CPU 54 in accordance with the detection output from the limit switches LS and the PG outputs of the conveyor motors 68 and 69.

The teaching operation of the press roll apparatus will now be described. The press roll apparatus described above has a property of flexibility and so can be used for a glass plate having substantially any three-dimensional surface. The apparatus can first be taught to give the necessary preliminary adhesion in individual glass plates having different three-dimensional surfaces. When the apparatus has learned all possible different three-dimensional surfaces of the glass plates, complete playback can be performed. In addition, the control data obtained from the different three-dimensional surfaces may be selectively used to perform preliminary adhesion of any type of glass plates having different three-dimensional surfaces.

Figure 12A:
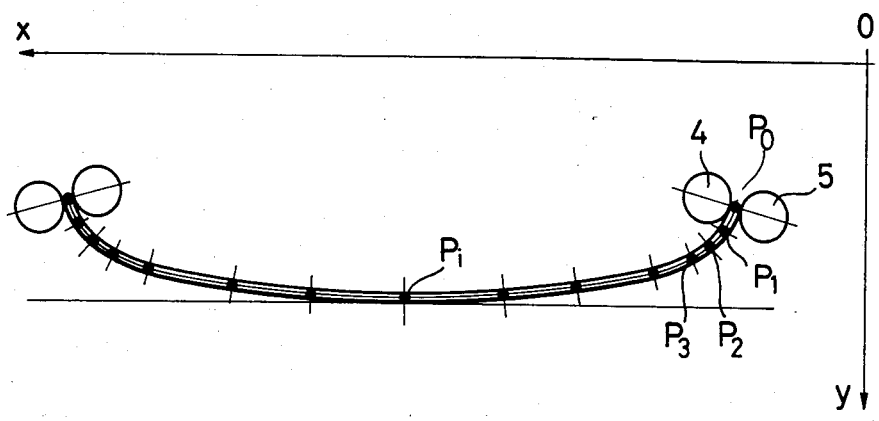
FIG. 12A is a sectional view of the laminated glass showing teaching sampling points.
Figure 12B:
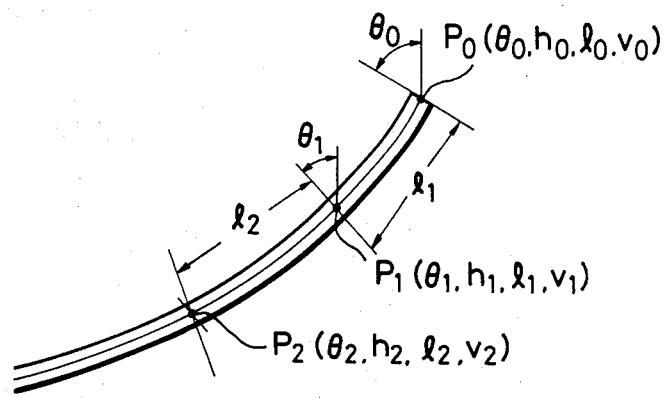
FIG. 12B is an enlarged sectional view showing part of the laminated glass of FIG. 12A.

The teaching operation is performed by using 15 to 20 sampling points $P_0$, $P_1$, ... along the cross section of the glass plate 1, as shown in FIG. 12A. The position of each sampling point is represented by absolute coordinates with respect to an origin O in the x-y coordinate system. More precisely, the x coordinate is plotted along the curve of the glass plate 1. As shown enlarged in FIG. 12B, distances between every two adjacent sampling points are given by angular displacements $l_1$, $l_2$, ... of the contact position between the press roll 4 and 5, respectively. The y coordinates correspond to positions representing the heights $h_0$, $h_1$, $h_2$, ... of the contact positions between the press rolls, respectively. Teaching data at the respective sampling points also include inclination angles $\theta_0$, $\theta_1$, ... of the line connecting the axes of the press rolls and rotational velocity data $v_0$, $v_1$, ... at the contact positions between press rolls, in addition to the above-mentioned angular displacement and height data. Therefore, the respective sampling points are defined by the following teaching data:

$P_0(\theta_0, h_0, O, v_0)$
$P_1(\theta_1, h_1, l_1, v_1)$
$\vdots$
$P_i(\theta_i, h_i, l_i, v_i)$
$\vdots$ The teaching data of each sampling point of FIG. 12A is supplied to the CPU 54 every time a teaching operation is performed and is stored in a memory table of the RAM 55. It should be noted that the real storage data in the RAM 55 is count data corresponding to the PG outputs from the pulse generators of the motors 26, 46 and 52 with respect to the reference position, excluding the rotational velocity data of the rolls. This rotational velocity data is arbitrarily preset in accordance with the command from the teaching box 77.

In the preliminary adhesion (playback mode), the respective teaching data are supplied to the NC control interfaces 60 to 62 so as to perform 3-axis NC control in synchronism with the outputs from the PGs of the respective motors 26, 52 and 46. The velocity data is supplied as a pulse rate (frequency) of a reference pulse generator of each NC control interface so as to distribute the reference pulses in accordance with a ratio of the relative coordinate data (h and l) of the sampling point $P_i$ to those of the adjacent sampling point $P_{i+1}$. The motors 26 and 46 are rotated to drive the press rolls 4 and 5 from the point $P_i$ to the point $P_{i+1}$ in accordance with the distributed pulses. On the other hand, the motor 52 is driven in accordance with the inclination angle data $\theta$ irrespective of the x-y coordinate system. The interpolation between the two adjacent sampling points can be linear or arc interpolation.

Figure 13:
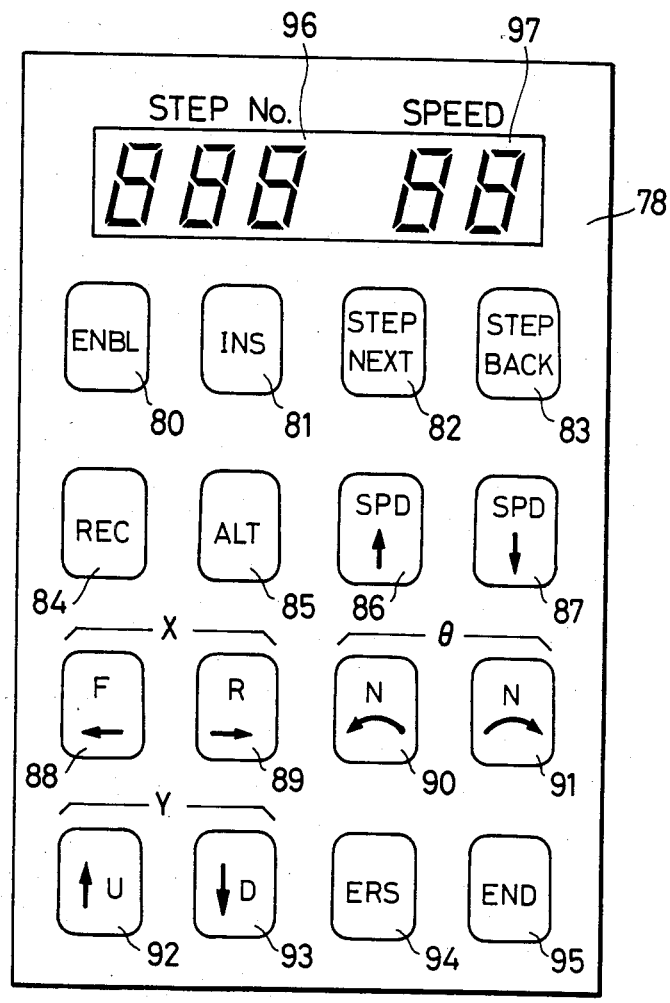
FIG. 13 is a front view of an operation panel of a teaching box.
Figure 14A:
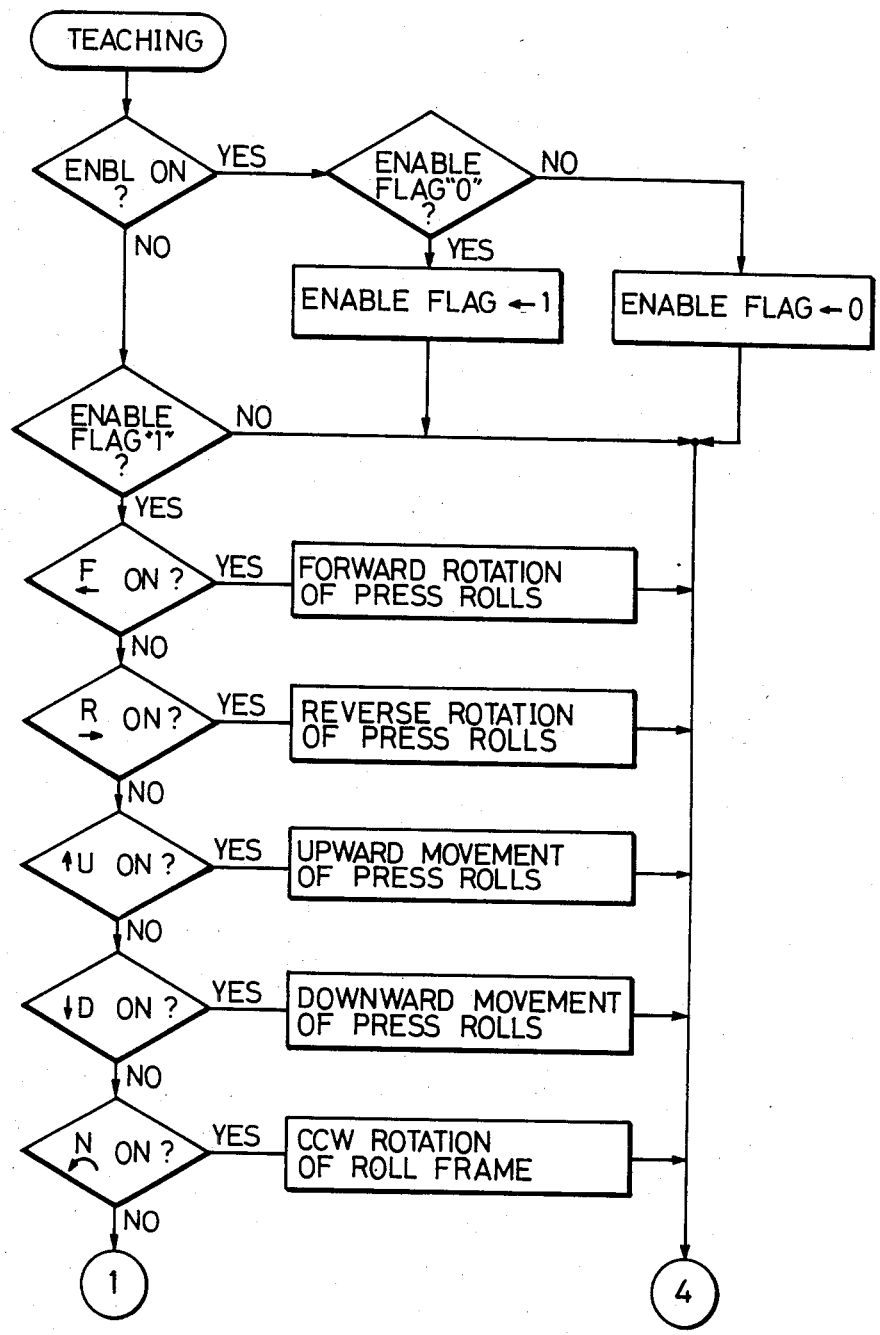
FIGS. 14A to 14C are respectively flow charts for explaining the teaching operation.
Figure 14B:
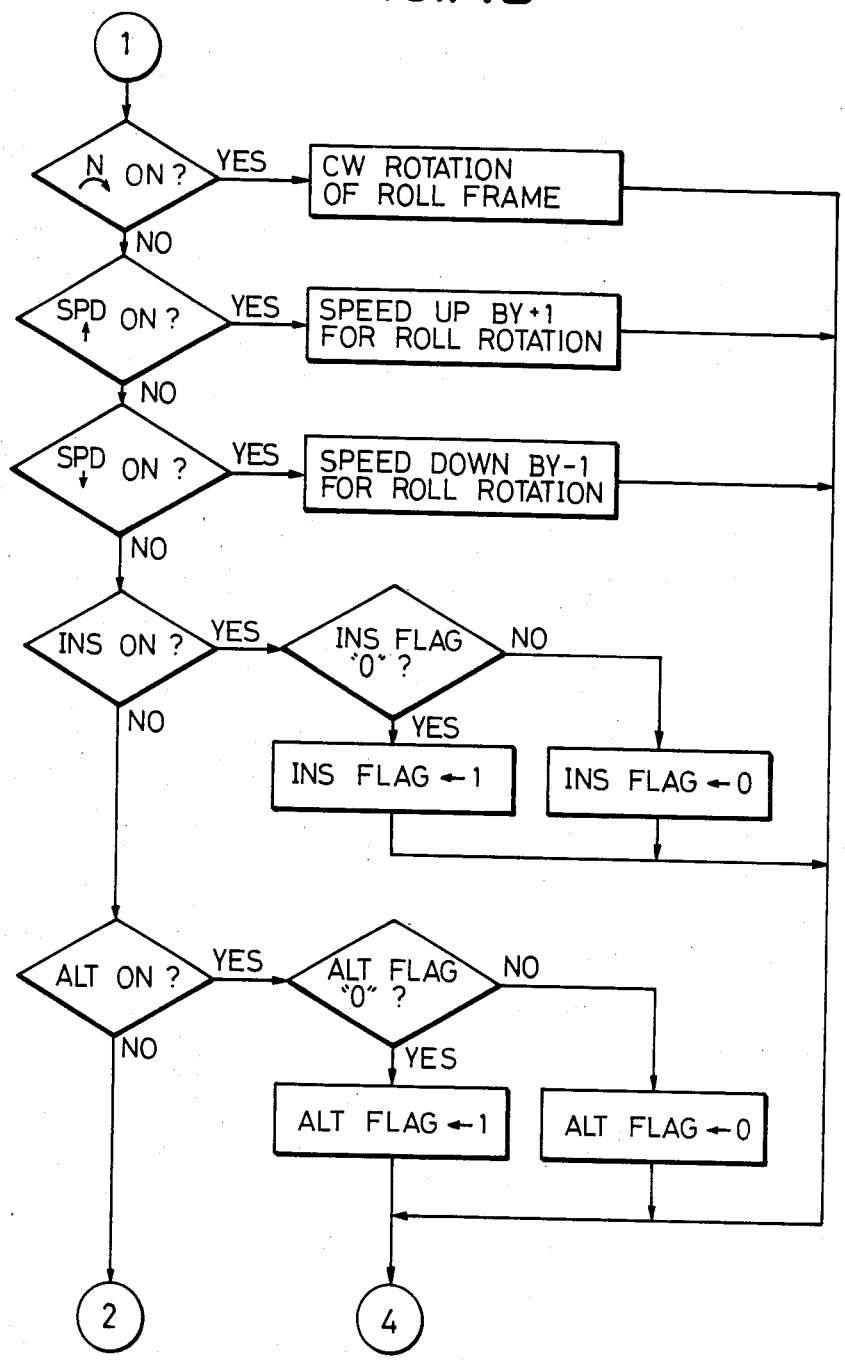
Figure 14C:
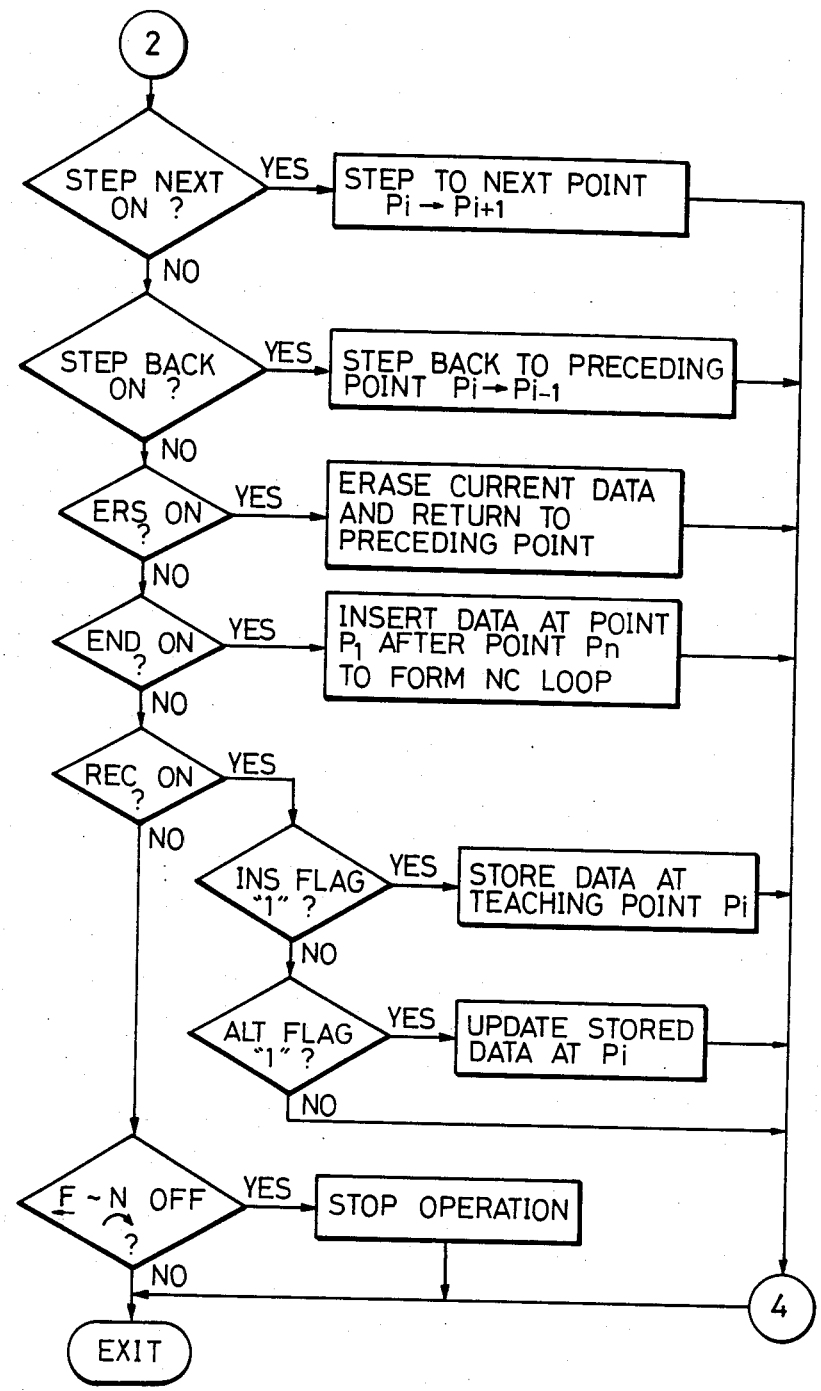

FIG. 13 is a plan view of an operation panel 78 of the teaching box 77. FIGS. 14A to 14C are respectively flow charts for explaining the teaching operation. The teaching box 77 is started when an ENBL (enable) key 80 shown in FIG. 13 is depressed. As shown in FIG. 14A, when the ENBL key 80 is depressed, an enable flag is set at logic "1" to enable key input operations by other keys. However, when the enable flag is set at logic "0", the key input operations by other keys are disabled. When an F←(forward) key 88 or an R→(reverse) key 89 is depressed, the rolls 4 and 5 are rotated in the forward or reverse direction so as to move the glass plate 1 forward or backward. The keys 88 and 89 are used to select an x coordinate. An ↑U (up) key 92 or ↓D (down) key 93 is depressed to move the roll frame 7 upward or downward to select a y coordinate. An N↺ (counterclockwise) 90 or an N↻ (clockwise) key 91 is depressed to preset the inclination angle $\theta$ (swinging angle) of the roll frame 7. The rotational velocity of the rolls 4 and 5 can be controlled by an SPD ↑ (speed up) key 86 or an SPD ↓ (speed down) key 87 in, for example, 16 steps. The velocity data is displayed on a display 97.

When the data $(\theta_i, h_i, l_i, v_i)$ of the sampling point $P_i$ are preset in accordance with the series of operations described above, an INS (insert) key 81 and an REC (record) key 84 are depressed to store the data of the sampling point $P_i$ in the RAM 55 through the CPU 54. As shown in FIG. 14B, when the INS key 81 is depressed, an INS flag is set at logic "1". Subsequently, when the REC key 84 is depressed, the data of the sampling point $P_i$ are stored in the RAM 55. In this case, when the previous data of the sampling point $P_i$ are stored in the RAM 55, an ALT (alter) key 85 is depressed to set an ALT flag at logic "1". Thereafter, when the REC key 84 is depressed, the data of the sampling point $P_i$ are updated. This teaching process is used to correct the locus of the contact points between the press rolls 4 and 5.

In order to preset teaching data of the next teaching point $P_{i+1}$ after the teaching of the sampling point $P_i$ is finished, a STEP NEXT (step next) key 82 is depressed, as shown in FIG. 14C. On the other hand, in order to return to the previous step, a STEP BACK (step back) key 83 is depressed. The current step number (reference number of the sampling point P) is displayed on a display 96 in the operation panel 78. When an ERS (erase) key 94 is depressed, the storage data of the sampling point $P_i$ are erased, and the teaching point position is returned to the immediately preceding point. When teaching of the last sampling point is finished, an END (end) key 95 is depressed, thereby inserting the data of the start sampling point $P_1$ after the data of the end sampling point $P_n$, as shown in FIG. 14C. In other words, the following loop is formed, and the NC operation loop is completed.

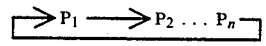

The NC control data stored by the teaching operation described above are stored in the data floppy disk 57 for each glass plate 1 having a different three-dimensional surface. Every time the type of glass plate conveyed along the preliminary adhesion production line changes, the corresponding data are read out from the floppy disk 57 and are stored in the RAM 55, thereby reproducing (playing back) the learned preliminary adhesion process in accordance with NC control.

Figure 15:
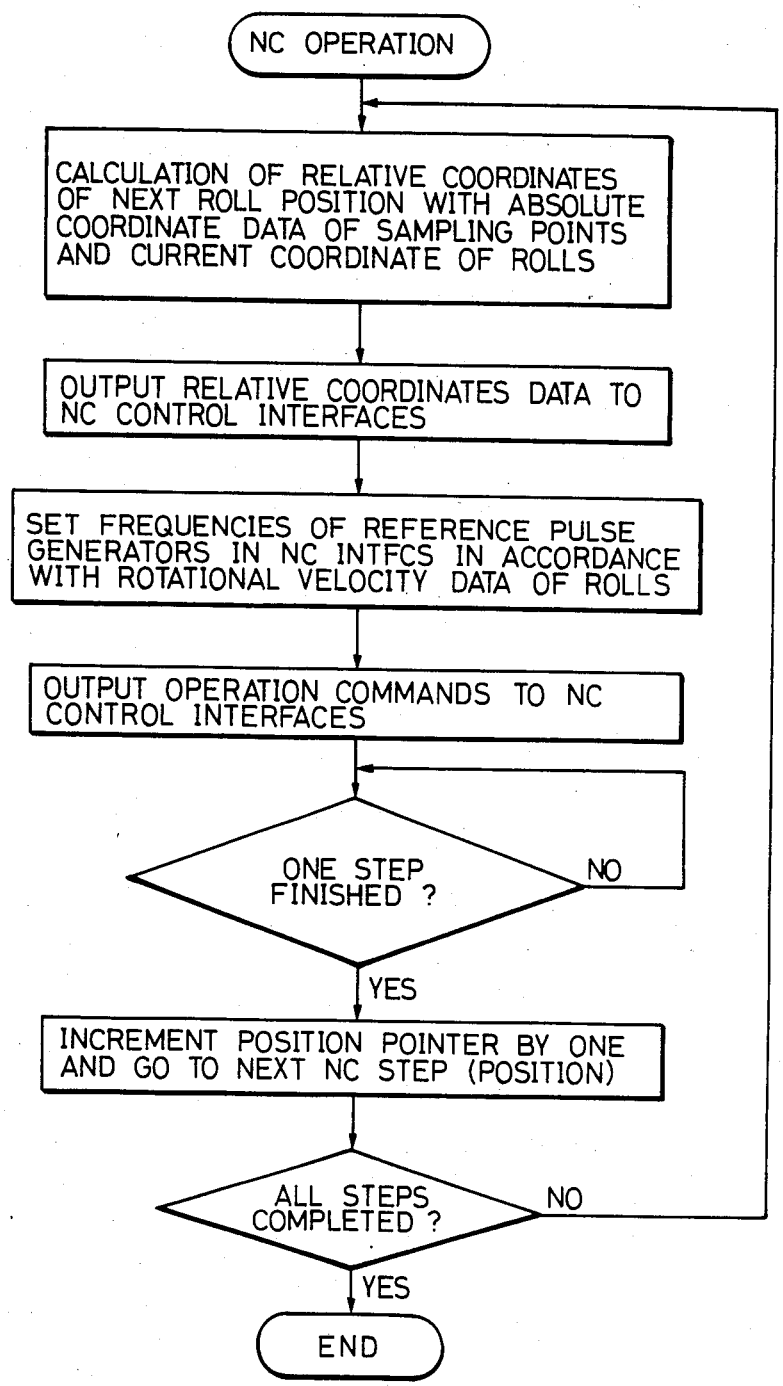
FIG. 15 is a flow chart for schematically explaining the NC (numerical control) operation.

FIG. 15 is a flow chart for explaining the NC control of preliminary adhesion. The NC operation command is generated from the CPU 54 when the glass plate 1 is inserted between the upper and lower press rolls 4 and 5, as shown in FIG. 9III. The 3-axis NC operation is thus started. Since the absolute coordinate data of the respective sampling points are given by teaching, the relative coordinates of the contact position between the press rolls are calculated in accordance with the absolute coordinates of the respective axes and the current coordinates thereof. The NC control interfaces 60 to 62 receive the corresponding relative coordinate data. The frequencies of the reference pulse generators of the NC control interfaces 60 to 62 are set in accordance with the rotational velocity data of the corresponding roll, thereby presetting the locus from the current point to the next point. The operation commands are simultaneously supplied to the 3-axis NC control interfaces 60 to 62. As a result, the NC control of the press rolls 4 and 5 is performed in accordance with linear or arc interpolation. When one step is finished, the end pulses from the NC control interfaces 60 to 62 are supplied to the CPU 54, and the position pointer is incremented by one. The next point data are read out under the control of the CPU 54, and the coordinate calculation or the like is performed again. When the above operation is repeated to complete all the steps, preliminary adhesion of one glass plate is completed. The press roll apparatus is then set in the standby state for receiving the next glass plate.

The present invention is exemplified by the above embodiment. However, various changes and modifications may be made within the spirit and scope of the invention. In the above embodiment, the rotational speed data of the roll is specified in units of teaching points (sampling points). However, NC control may be performed at a constant velocity. In addition to this modification, NC control may be performed such that the inclination angle $\theta$, the angular displacement l and the rotational velocity v are specified in units of teaching points, and the height data h (y-axis) may be calculated in accordance with $v\cos\theta$ so as to synchronize the lift frames 29 and 30.

Furthermore, when the number of sampling points for teaching is sufficiently large, interpolation by NC need not be performed. In this case, the motors 26, 52 and 46 can be driven in response to outputs from the D/A converters 70 and 71 in the same manner as in the conveyor motors 68 and 69 of FIG. 8.

According to the press roll apparatus of the present invention, the roll frame is angularly displaced such that the line of action of the pressure of the press rolls is directed toward substantially normal to the curved surface of the laminated glass, and the roll frame is level-shifted such that the point of action of the press pressure follows the curved glass surface. The rotation of the press rolls and the angular displacement and height of the roll frame are controlled in accordance with the preset data. Even if the laminated glass has a complicated three-dimensional surface, it can be pressed so as to follow the curved surface in accordance with the control data, thereby improving the press performance. In addition to this advantage, laminated glass sheets having different three-dimensional surfaces can be properly subjected to high-speed preliminary adhesion by merely changing the control data. As a result, the press efficiency can be greatly improved.

What is claimed is:

1. A press roll apparatus for curved laminated glass, comprising:

a press roll unit having press rolls which press against the opposite sides of a laminated glass assembly having a curved surface to press it together;

press roll drive means for driving said press rolls to roll along the surface of the laminated glass and move it in a given direction;

a roll frame for rotatably supporting said press roll unit;

roll frame drive means for rotating said roll frame so that the pressure of the press rolls on the laminated glass assembly is normal to the glass surface;

a support frame for supporting said roll frame at various heights;

support frame drive means for shifting the height of said support frame;

memory means for storing a plurality of sets of data corresponding, respectively, to each of a series of locations along the curved surface of the laminated glass assembly in the direction of rolling through said apparatus, each set of data including:

first data representing the distance of the location along the surface of the glass, in said direction of rolling, from a reference location;

second data representing the angle of the surface of the glass at said location relative to a reference angle and third data representing the height of the glass at said location relative to a reference height;

and means for operating said press roll, roll frame and support frame drive means in synchronism according to each set of data in succession such that said press rolls, said roll frame and said support frame are simultaneously driven from their respective locations corresponding to one set of data, to their respective locations corresponding to the next successive set of data.

2. An apparatus according to claim 1, wherein said press roll unit comprises a pair of upper and lower rolls which are biased against each other, each of said pair of upper and lower rolls being divided into a plurality of roll segments, some roll segments of said plurality of roll segments which are located at a central portion along a width of each of said pair of upper and lower rolls being arranged as drive rolls rotated by a drive power source, and remaining roll segments of said plurality of roll segments being arranged as free rolls.

3. An apparatus according to claim 2, wherein each of said free rolls of said pair of upper and lower rolls is supported on said roll frame through a roll shaft and pivot shafts extending from both ends of said roll shaft along a glass moving direction in such a manner that a press surface of said free rolls of said pair of upper and lower rolls is inclined along a radius of curvature along the width of each of said pair of upper and lower rolls.

4. An apparatus according to claim 1, wherein said roll frame has rotating shafts at both sides of said press roll unit, said rotating shafts having an axis matching with a contacting line of said upper and lower rolls and being rotatably supported by a pair of lift frames to be moved along a direction perpendicular to a moving plane of the laminated glass, respectively.

5. An apparatus according to claim 4, wherein one of said rotating shafts has a cylindrical shape and has a drive shaft therein, one end of said drive shaft being coupled to a roll drive motor mounted on a corresponding one of said pair of lift frames and the other end being coupled to the roll rotating shaft through power transmitting means.

6. An apparatus according to claim 4, wherein the other of said rotating shafts is coupled to a swinging mechanism mounted on a corresponding one of said lift frames and is applied with a rotating force so as to angularly displace said roll frame.

7. An apparatus according to claim 6, wherein said swinging mechanism comprises a worm wheel fixed on the other of said support shafts, a worm meshing with said worm wheel and a motor coupled to said worm.

8. An apparatus according to claim 4, wherein said pair of lift frames is slidably guided to be parallel to each other by guiding means respectively disposed on a pair of legs supporting said roll frame and is moved in a direction perpendicular to the moving plane upon rotation of a pair of feed screws each extending along a slidable direction of said pair of lift frames.

9. An apparatus according to claim 8, wherein said pair of feed screws are coupled to a single drive shaft extending along the width of said press roll unit through a reduction gear mechanism, said drive shaft being coupled to a motor so that said pair of lift frames are moved parallel to each other upon normal and reverse rotations of said motor, whereby said upper and lower rolls are level-shifted in a direction perpendicular to the moving plane while said upper and lower rolls are kept parallel to the moving plane.

10. An apparatus according to claim 1, wherein said memory stores as the data of the curved surface of the laminated glass the angle data of the curved surface with respect to a normal thereto along the moving direction of the laminated glass, said memory further stores the rotational velocity data of said press roll unit, the rotational velocity data being supplied to said rotation drive means of said press roll unit, and there is further provided calculating means for calculating velocity control data along a height of said press roll unit in accordance with a trigonometric function using the rotational velocity data and the angle data, the velocity control data being supplied to said drive means for controlling the level shift of said press roll unit.

11. An apparatus according to claim 1, further comprising external operating means for manually supplying operating command data of the rotation, the angular displacement and the level shift of the press roll unit to said means for operating said press roll, roll frame and support frame drive means so as to control the posture of said press roll unit along a sampled curved surface of the laminated glass, the operating command data of a number of sampling points along the samples curved surface of the laminated glass being stored as a teaching data in said memory.

12. Apparatus according to claim 1, wherein said memory includes storage means for storing plural sets of data for plural types of laminated glass having different dimensions from each other and wherein said means for operating said press roll, roll frame and support frame drive means includes means connected to transfer selected sets of data from said storage means according to a selected type of laminated glass to be roll pressed.

13. Apparatus according to claim 1, wherein said means for operating said press roll, roll frame and support frame drive means each includes a servo unit for controlling the respective drive means in response to each set of data respectively from said memory means.

14. Apparatus according to claim 13, wherein said memory means is connected to store data representing the rotational velocity of said press rolls at each of said series of locations and further including means communicating the data of the rotational velocity as part of a control factor to said means for operating said roll frame and support frame drive means.

15. An apparatus according to claim 14, wherein there are provided a supply conveyor and a take-up conveyor at the supply and take-up sides of said press roll unit, and further comprising calculating means for calculating a moving velocity along the moving direction of the laminated glass when the laminated glass passes through said press roll unit in accordance with the rotational velocity data and the angle data of said press roll unit, a D/A converter for converting an output from said calculating means, and a servo circuit for controlling rotational velocities of motors for said supply and take-up conveyors in accordance with an output from said D/A converter, whereby the moving velocity of the laminated glass and the convey velocities of said supply and take-up conveyors are synchronized when the laminated glass is passed through said press roll unit.

16. Apparatus according to claim 1 and further including a supply conveyor and a take-up conveyor at supply and take-up sides of said press roll unit, said supply and take-up conveyors having convey planes which match with the moving plane of the laminated glass and wherein said apparatus further includes urging means at a terminal portion of said supply conveyor, said urging means being arranged to urge the laminated glass along the direction perpendicular to the convey plane of said supply conveyor and being temporarily operated when the laminated glass is inserted between said pair of upper and lower rolls.

17. An apparatus according to claim 16, wherein said urging means comprises a piston cylinder directed along the convey plane of said supply conveyor, a piston rod biased by said piston cylinder, and a pair of glass hold rolls which are rotatably mounted at distal end portions of two arms branched along the width of said supply conveyor, said pair of glass hold rolls having a rotating shaft extending along the width of said supply conveyor, whereby the rotation of the laminated glass on said supply conveyor is prevented when said glass hold rolls urge the curved surface of the laminated glass.

18. An apparatus according to claim 16, further comprising a pulse generator arranged in a power source of said supply conveyor, a counter for counting an output from said pulse generator, and a glass passage detection sensor disposed in a vicinity of a convey path of said supply conveyor, said counter being operated on the basis of an output signal from said glass passage detection sensor so as to determine a timing for inserting the laminated glass in said press roll unit, thereby operating said urging means.

19. Apparatus according to claim 1 and further including means to interpolate between the values of corresponding data of successive sets and wherein said means for operating said press roll, frame and support frame drive means is arranged to operate according to such interpolation.

* * * * *

UNITED STATES PATENT AND TRADEMARK OFFICE
CERTIFICATE OF CORRECTION

PATENT NO. : 4,696,713　　　　　　　　　　Page 1 of 2
DATED : September 29, 1987
INVENTOR(S) : MASAHARU OKAFUJI, ET AL.

It is certified that error appears in the above-identified patent and that said Letters Patent is hereby corrected as shown below:

SHEET 10

Figure 11, "VEROCITY" should read --VELOCITY--
    (4 occurrences)

COLUMN 3

Line 63, "unit but" should read --unit 3 but--.

COLUMN 5

Line 60, "and data" should read --and a data--.

COLUMN 6

Line 1, "an" should read --a--.

COLUMN 8

Line 25, "plate is" should read -- plate 1 is".
Line 44, "perform-preliminary" should read --perform preliminary--.

COLUMN 9

Line 53, "(counterclockwise) 90" should read --(counterclockwise) key 90--.

COLUMN 11

Line 66, "angle and" should read --angle; and--.

UNITED STATES PATENT AND TRADEMARK OFFICE
CERTIFICATE OF CORRECTION

PATENT NO. : 4,696,713

DATED : September 29, 1987

INVENTOR(S) : MASAHARU OKAFUJI, ET AL.

It is certified that error appears in the above-identified patent and that said Letters Patent is hereby corrected as shown below:

SHEET 10
COLUMN 12

Line 1, "press roll," should read --press rolls,--.

COLUMN 13

Line 21, "samples" should read --sampled--.

Signed and Sealed this

First Day of March, 1988

Attest:

DONALD J. QUIGG

Attesting Officer

Commissioner of Patents and Trademarks